(12) United States Patent
Hidaka et al.

(10) Patent No.: US 6,723,262 B2
(45) Date of Patent: Apr. 20, 2004

(54) METHOD FOR MANUFACTURING A HONEYCOMB STRUCTURE HAVING SLITS

(75) Inventors: Kazuhiko Hidaka, Nagoya (JP); Tetsuji Takagi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 349 days.

(21) Appl. No.: 09/768,891

(22) Filed: Jan. 24, 2001

(65) Prior Publication Data

US 2001/0020756 A1 Sep. 13, 2001

(30) Foreign Application Priority Data

Feb. 23, 2000 (JP) .................................. 2000-046530

(51) Int. Cl.⁷ ............................................. B29C 47/92
(52) U.S. Cl. ....................... 264/40.5; 264/630; 264/634; 264/146
(58) Field of Search ................................. 264/40.5, 630, 264/634, 146, 154, 156, 177.12, 209.1, 210.2; 425/150, 290, 296, 309

(56) References Cited

U.S. PATENT DOCUMENTS

| | | | | |
|---|---|---|---|---|
| 3,683,059 A | * | 8/1972 | Fairbanks | .................... 264/167 |
| 4,584,150 A | * | 4/1986 | Ballocca | ..................... 264/40.1 |
| 4,781,831 A | | 11/1988 | Goldsmith | |
| 4,960,375 A | * | 10/1990 | Saito et al. | ............... 425/131.1 |
| 5,028,466 A | * | 7/1991 | Trotignon | ................ 428/36.91 |
| 5,149,475 A | * | 9/1992 | Horikawa et al. | .......... 264/630 |
| 5,240,663 A | * | 8/1993 | Stringaro et al. | ........... 264/150 |
| 5,447,670 A | * | 9/1995 | Ito et al. | ..................... 264/146 |
| 5,855,781 A | | 1/1999 | Yorita et al. | |
| 5,980,227 A | * | 11/1999 | Murata et al. | .............. 425/144 |
| 5,989,466 A | * | 11/1999 | Kato et al. | ................. 264/40.5 |

FOREIGN PATENT DOCUMENTS

| EP | 0 017 686 A1 | 10/1980 |
|---|---|---|
| EP | 0 452 125 A2 | 10/1991 |

\* cited by examiner

*Primary Examiner*—Mark Eashoo
(74) *Attorney, Agent, or Firm*—Burr & Brown

(57) ABSTRACT

A method for manufacturing a honeycomb structure having slits is provided which permits accurate forming of fine slits to cut or grind a targeted cell array alone and which is suitable for application to mass production. The method provides a honeycomb structure having slits and a plurality of arrays of numerous cells aligned in parallel. The slits communicate with an external space and formed along the arrays. The slits are formed by protruding a slit forming member 4-toward the molded article during the extrusion step.

5 Claims, 11 Drawing Sheets

EXTRUDING DIRECTION OF MOLDED ARTICLE →

METHOD FOR MANUFACTURING A HONEYCOMB STRUCTURE HAVING SLITS

BACKGROUND OF THE INVENTION

1. Field of Invention

The present invention is directed to a method for manufacturing a honeycomb structure having slits and having a plurality of rays of numerous cells aligned in parallel, an apparatus for manufacturing the same, and more particularly to a method for manufacturing a honeycomb structure having slits formed along arrays of numerous cells aligned in parallel and communicating with an external space, and an apparatus for manufacturing the same.

2. Related Art Statement

A honeycomb structure is known as a structure in which a plurality of arrays of numerous cells are formed by being aligned in parallel to a base, and is used as a light yet strong structural member for aircraft or the like, and a catalyst carrier having a large air flow for automotive exhaust gas purification or the like. Additionally, it is utilized as a dust filter or a solid-liquid separation filter having a large filtering area per unit volume, in a case where the base is made of a ceramic porous material having fine pores.

The aforementioned applications are derived from the feature of the honeycomb structure in that it has a plurality of cells isolated from external space, however, slits communicating with external space are formed on the structure by deliberately cutting or grinding parts of the cells for certain purposes.

For instance, a honeycomb structure 21 shown in FIG. 2(b) is a solid-liquid separation filter for removing insoluble matters of a particle diameter larger than the pores of a base 22 by injecting a liquid to be treated into cells 23 and by letting only a filtrate that has passed the pores of the base 22 flow out to external space. A part of the cells 23 is deliberately cut or ground along the specific cell arrays 26a out of a plurality of cell arrays 26 to form slits 24, thereby the structure can communicate with external space. Such a honeycomb structure will be referred to hereinafter as a honeycomb structure having slits.

In such a solid-liquid separation filter, as a filtrate having passed the inside of the base 22, i.e. cells near the central part, flows out directly through the slits 24 to external space, the traveling distance of the filtrate through pores of the base 22 can be shortened to reduce the fluid resistance during filtration. This results in the advantage that, even where a filter having a large volume is used, the liquid throughput is not reduced and a sufficient filtering capacity can be retained.

Furthermore, the contamination of the filtrate with a liquid to be treated can be prevented merely by sealing the cell arrays 26a in which the slits 24 are formed at the both ends of said arrays 26a with a sealing member 25 made of glass or the like.

According to the conventional methods, a honeycomb structure having slits as described above is manufactured by drying and firing ceramic body after extruding and:

(1) marking off the external side face of the structure in such a manner that the specified cell arrays in which slits are to be formed at both end faces of the honeycomb structure where cell openings are located, are connected with the marked off line, and forming the slits by cutting or grinding the marked off portions with a micro-grinder, drill or the like. This method is hereinafter referred to as a first method; or (2) forming slits by cutting the structure along the specified cell arrays with a grind stone or the like watching with naked eyes to determine the position of the cell arrays of the honeycomb structure at which the slits are to be formed. This method is hereinafter referred to as a second method.

However, in the case of the first method, it is not possible to eliminate machining errors such as breaking arrays of adjacent cells or cutting cell walls of adjacent cells, even cuffing the marked off portions accurately. This is because it is not so easy even for well-experienced workers to cut or grind the targeted cell arrays alone, in addition to the troublesome manual work of marking off. This is because the cell arrays in which slits are to be formed are not always positioned along the lines connecting the cell arrays marked off at the end faces where cell openings are located of the structure due to the frequent distortion and/or frequent deformation of cell arrays, which is derived from the compression or the deformation of the molded article during the steps of extruding, drying and firing the molded article.

That is, the first method is not a simple one fitted for mass production, and furthermore it is difficult to form fine slits accurately.

The difficulty in forming fine slits accurately means that the formation of slits in a honeycomb body of such a fine structure that one having fine cell pores of 2 to 3 mm and having a wall thickness of about 0.5 mm is extremely difficult.

The second method, on the other hand, can reduce machining errors because slits are formed while watching the cell arrays with naked eyes, compared with the first method. However, there is still a problem since it requires such troublesome manual work that one should cut into the end faces of the structure while watching the cell arrays with naked eyes. Accordingly, one may say that fine slits can be formed accurately by utilizing the second method, however, there is a problem in that it is not simple to apply it to mass production.

Moreover, there is another problem in the second method in that the mechanical strength at the two ends of the structure is weakened because, inevitably, slits are formed there. The weakened mechanical strength at the two ends of the structure is not preferable. This is because the filter is easily broken by mechanical forces such as distortion or impact given thereto at the time of fitting; and the bending stress derived from the dimensional tolerance of the structure or the surface pressure of sealing, in the case that one uses the structure as a solid-liquid separation filter by utilizing both ends of the structure as a sealing portion at the time of fixing it at both ends.

Moreover, the formation of the slits is no an easy task in either the first method and the second method since a honeycomb structure hardened and densified after firing should be used for the processing of the slits in both methods. The second method may be applied to a molded article before drying and firing, however, it is not preferable since there is a fear of magnifying the contraction or deformation of the structure at the two ends at the time of drying and firing. This might cause sealing failure when the structure is used as a solid-liquid separation filter.

As hitherto described, any conventional method for manufacturing a honeycomb structure having slits is not satisfactory since it is furnished with neither formation of slits in accuracy and fineness nor sufficient simplicity fitted for mass production.

SUMMARY OF THE INVENTION

The present invention has been made so as to solve those problems. That is, the object of the present invention is to provide a method for manufacturing a honeycomb structure having slits capable of forming accurately fine slits by cutting or grinding the specified cell arrays alone, and being fitted to mass production.

The present invention has been completed, as a result of intensive studies, based on the findings that those problems mentioned above can be solved by adopting a slit forming method in which a slit forming member is protruded during the step of extruding a honeycomb structure.

Thus, according to the present invention, there is provided a method for manufacturing a honeycomb structure having slits and having a plurality of arrays of numerous cells aligned in parallel; the slits communicating with external space and being formed along the cell arrays, wherein the slits are formed during the step of extruding a honeycomb structure by protruding a slit forming member toward the molded article during that time.

In the method according to the present invention, slits can be formed during the extrusion step with the formation of cells, or alternatively the slits may be formed by cutting the specified arrays after the formation of the cells.

Further in the method according to the present invention, it is preferable to monitor the position of the molded article during the step of the extrusion, and to control the actions of the slit forming member based on the monitoring.

Further according to the present invention, there is provided an apparatus for manufacturing a honeycomb structure having slits and a plurality of arrays of numerous cells aligned in parallel; the slits communicating with external space and being formed along the cell arrays, which comprises an extruder having an extruding die for a honeycomb structure, and a slit forming member installed near the extruding die and capable of protruding along specified cell arrays of a molded article being extruded in which slits are to be formed.

In the apparatus according to the present invention, the slit forming member may be arranged so as to protrude either inwardly or outwardly toward the extruding die. Where the slit forming member is arranged so as to protrude outwardly the extruding die, a J-shaped bit is preferable as a slit forming member.

Further, it is preferable to have monitoring means for monitoring the position of the molded article being extruded and control means for controlling the actions of the slit forming member based on the monitoring data.

BRIEF DESCRIPTION OF THE DRAWINGS

FIGS. 1(a) and 1(b) show schematic cross sections of a sift part in one preferred embodiment of a method for manufacturing a honeycomb structure having slits according to the present invention, wherein FIG. 1(a) shows how slits are formed only on an external wall portion of a molded article, and FIG. 1(b) shows how slits are formed in the internal of the molded article.

FIGS. 2(a) and 2(b) schematically illustrate a honeycomb structure having slits in one mode of implementing the present invention, wherein FIG. 2(a) shows an expanded view of a cell part and FIG. 2(b), a perspective view of the overall shape.

FIG. 3 schematically illustrates a honeycomb structure having slits as another embodiment of the present honeycomb structure having slits, wherein

FIGS. 12(a) and 12(b) schematically illustrate heat exchangers, wherein FIG. 12(a) shows a conventional heat exchanger and FIG. 12(b), a heat exchanger using a honeycomb structure having slits obtainable according to the present method.

DETAILED DESCRIPTION OF THE INVENTION

The method for manufacturing a honeycomb structure having slits according to the present invention is characterized in that, at the step of extruding the honeycomb structure, slits are formed by protruding the slit forming member toward the molded article. Fine slits may be formed by cutting or grinding only the targeted cell array or arrays according to the present method and this method is a simple one fitted to mass production. The present invention will be described in detail below.

1. Manufacturing Method

A first feature of the method for manufacturing a honeycomb structure having slits according to the present invention is to form slits during the step of extruding the honeycomb structure. According to the present method, a relatively soft green molded article is used for the formation of the slits instead of a hardened and densified, dried, and/or fired article. The formation of slits may be done simultaneously with the extrusion of a honeycomb structure body, time and labor required for manufacturing a honeycomb structure having slits may be saved, compared with separate slit forming method using a dried or a fired article according to the conventional method.

Figure 2A:
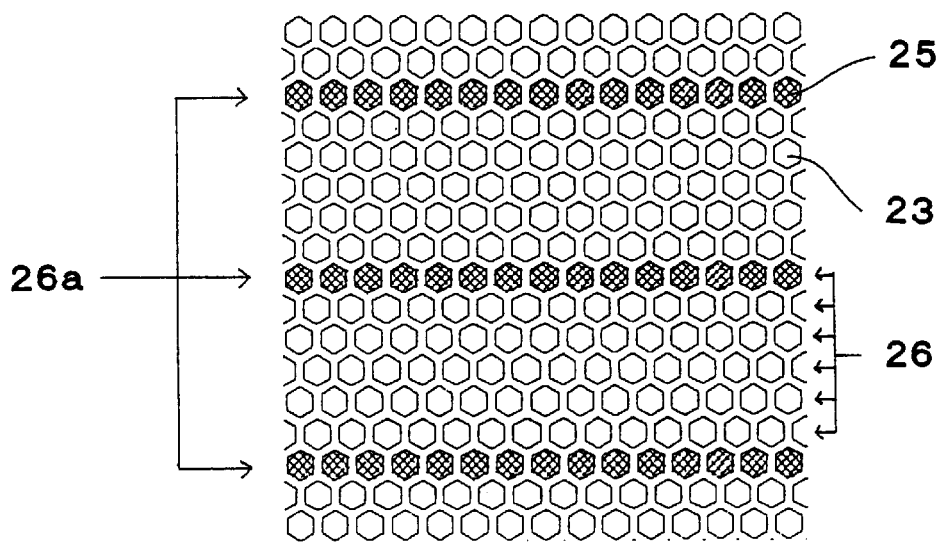
Figure 2B:
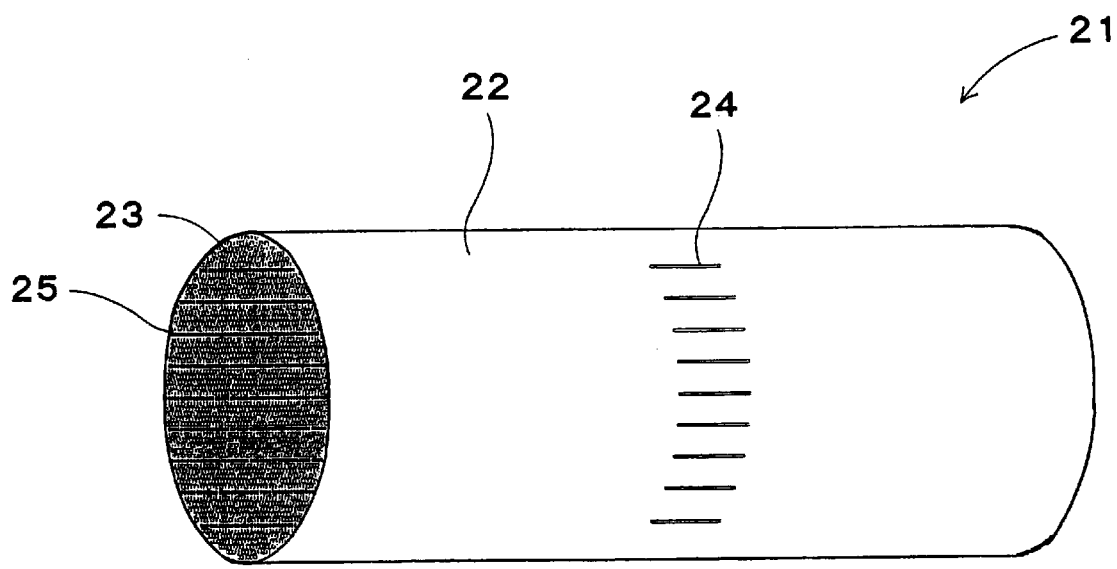

Further, in the case where the slit cell arrays 26a are to be sealed as shown in FIG. 2(a) according to the present method, the firing of the molded article and that of sealing members 25 may be made simultaneously. Thus, one may save one step for firing, compared with the case when slits are formed in a fired article.

Thus, one may say that this method is not only a highly productive method, but also a method fitted to mass production.

Even in the first method among the conventional methods, the firing of a molded article and that of sealing members can only be done at the same time if the cell arrays in which slits are to be formed are sealed prior to firing. In this case, however, it is not preferable since the removal of the chips formed during forming the slits or the like becomes difficult because the formation of slits is done after sealing.

A second feature of the method for manufacturing a honeycomb structure having slits according to the present invention is to form slits by boring slits in a molded article while the molded article is being extruded.

Since slits are formed either simultaneously with or immediately after the formation of the cells of the honeycomb structure, the position matching of the slit forming member with the targeted cell array(s) becomes easier according to this method. Thus, the molded article is less susceptible to the impacts of compression or deformation during extrusion and the drying and firing of the molded article than separate slit forming method after extrusion.

Therefore, it is made possible to accurately form fine slits by cutting only the targeted cell array(s), thereby the occurrence of machining errors such as breaking adjacent cell arrays or cutting adjacent cell walls can be reduced. As this method does not involve any troublesome manual work such as marking off of the external face in the structure or cutting into the end faces of the structure while watching the cell array(s) with naked eyes, it may be automated and is fitted to mass production.

A third feature of a method for manufacturing a honeycomb structure having slits according to the present invention is to form slits by protruding a slit forming member toward a molded article during the extruding step.

Slits may be formed even in the central part of the structure according to the present method. This is because the formation of slits having any desired length in any desired position of a structure in its lengthwise direction may be done by adjusting the position of the molded article during the extrusion step and the timing for protruding the slit forming member.

Therefore, the problem of weakened mechanical strength at the two ends of the structure or increased compression or deformation can be averted, and thus this method may be applicable, with a particular suitableness, to the manufacture of a honeycomb structure having slits for a solid-liquid separation filter.

Figure 3A:
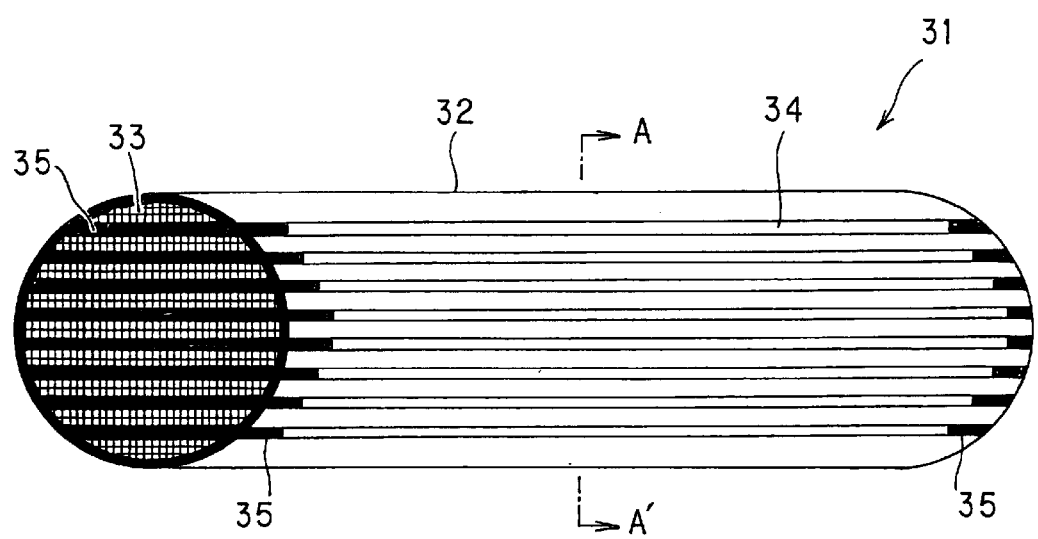
FIG. 3(a) is a perspective view of the overall shape and FIG. 3(b), an expanded view of cell portion.
Figure 3B:
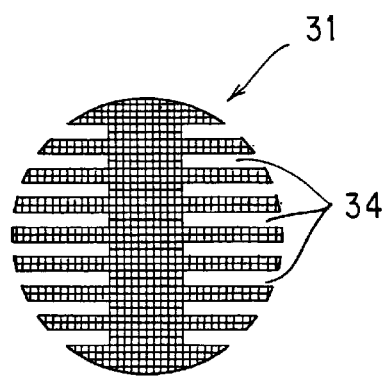

Incidentally, It is not preferable to fix a slit forming member to the extruding die instead of protruding the silt forming member toward a molded article. This is because slits 34 would be formed all over the external circumference of the molded article 32 as illustrated in FIG. 3(*a*). As a consequence, the mechanical strength of the molded article 32 is weakened, and breakage during extrusion of a molded article or handling the molded article or breakage due to stress concentration at the time of drying or firing becomes inevitable.

In order to accurately form slits in any desired position of the structure in its lengthwise direction, it is preferable to monitor the position of the molded article being extruded and control the actions of the slit forming member based on monitoring data accordingly.

Specific methods of monitoring the position of the molded article being extruded include: (1) direct monitoring of the position of the molded article with a sensor or the like, and (2) indirect monitoring by measuring and converting any one factors inclusive of the quantity, duration time for extrusion and the like at the time of extruding a puddled ceramic mixture. By controlling the timing of the actions, i.e. protrusion and retracting of the slit forming member according to the monitored position, slits may be accurately formed in any desired position of the structure in its lengthwise direction.

In this manufacturing method according to the present invention, the slit forming member may be protruded along the cell array(s) in which slits are to be formed of the molded article being extruded.

Where the slit forming member is protruded simultaneously with the cell formation of the honeycomb structure, the slit forming member may constitute a part of the extruding die, and slits may be formed by extrusion. Where the slit forming member is protruded immediately after the cell formation, slits may be formed by cutting specified portion (s) of the molded article being extruded.

Incidentally, while usually a slit forming member is protruded along one cell array and only that cell array is cut or ground, a slit forming member may as well be protruded along a plurality of mutually adjoining cell arrays to simultaneously cut or ground the plurality of cell arrays.

In the method for manufacturing a honeycomb structure having slits according to the present invention, the depth of the slits is not particularly limited, and it may be provided only in the vicinity of the external face of the structure or, in some cases, go through the structure. Further, a plurality of slits can as well be formed in the lengthwise direction of one cell array of the honeycomb structure or in not just one but a plurality of cell arrays.

Although the length of the slits is not particularly limited, the total slit length in any one cell array should preferably be not more than ⅓ of the overall length of the structure in view of mechanical strength. Where a plurality of slits are to be formed in one cell array, it is preferable to keep the spacing between the respective slits at ¹⁄₁₀ of the length of the slit or more.

Further, the length of slits is not necessarily equal, but, for instance, the length may be short in the internal portion of the structure and increased in the external portion thereof. Such a configuration is useful when the structure is used as a solid-liquid separation filter, because it enables the filtrate to be efficiently discharged to external space. This is because, in the case of a solid-liquid separation filter, the amount of the filtrate discharged through slit is increased due to the joining of filtrate from many cells at a peripheral portion of the structure, while the amount of the filtrate discharged through slits in the internal portion thereof is less.

2. Manufacturing Apparatus

The method for manufacturing a honey comb structure having slits according to the present invention can be carried out by using an apparatus for manufacturing a honeycomb structure having slits, which comprises, an extruder having an extruding die for a honeycomb structure, and a slit forming member arranged in the vicinity of the extruding die and being movable along specified cell array(s) of an extruded article in which slits are to be formed.

(1) Extruder

Generally, an extruder is a molding machine that is provided with an extruder and an extruding die and can consecutively provide a molded article of a desired shape by extruding a molding material charged to the extruder from the extruding die. For the apparatus according to the present invention, there is no limitation regarding the type of the extruder to be used, and a conventional known extruder can be suitably used such as a single-shaft, double-shaft or multi-shaft screw extruder or a plunger extruder.

Figure 4:
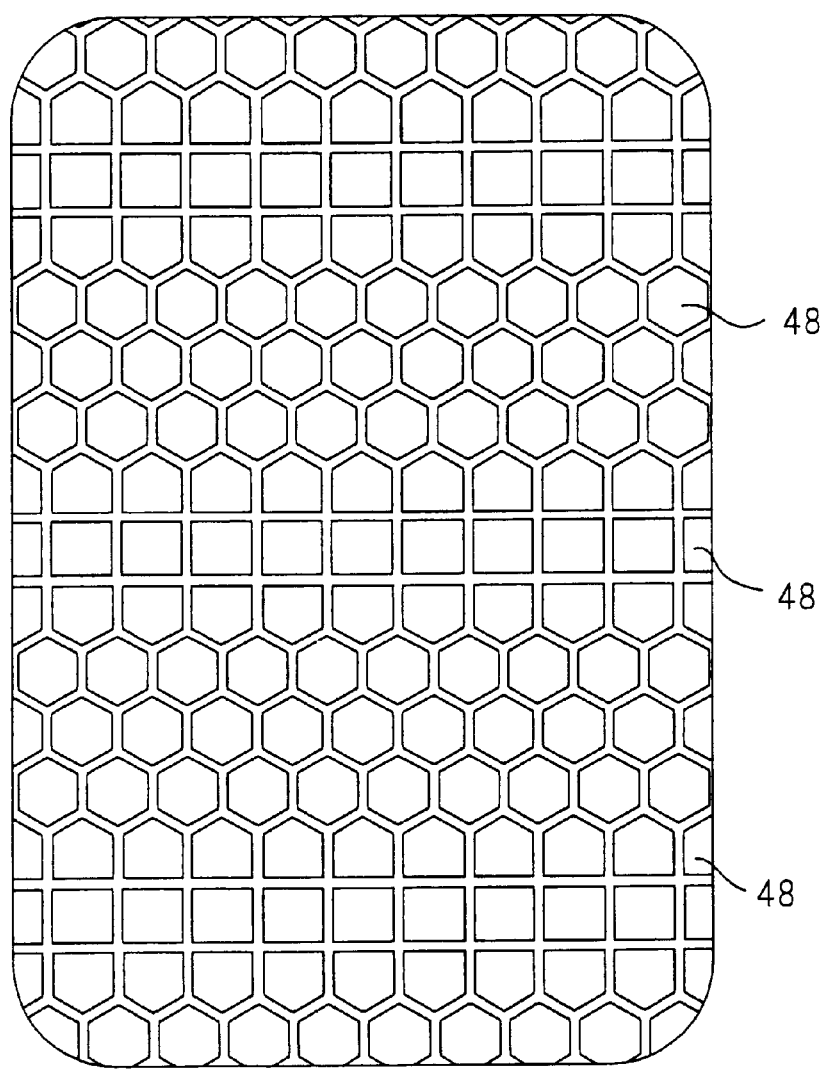
FIG. 4 schematically illustrates a shape of an extrusion mouth piece.

The extruding die in the apparatus for manufacturing a honeycomb structure having slits according to the present invention is required to have an internal wall corresponding to an external shape of a honeycomb structure, and a shape in which cell blocks 48 corresponding to many cells aligned in parallel as shown in FIG. 4. That is, it should have a shape complementary to a honeycomb structure to be extruded. Many cells are formed since the cell blocks 48 of the die block a molding material from being pushed forward from the back side (not shown) of the die shown in FIG. 4.

Incidentally, according to the present invention, a puddled mixture obtained by admixing a mixture comprising a ceramic powder, a binder, and a solvent, and optionally a surface active agent, a plasticizer or the like is used as a molding material.

(2) Slit Forming Member

The slit forming member in the apparatus for manufacturing a honeycomb structure having slits according to the present invention is a member for forming slits in a green molded article which is being extruded.

Therefore, unlike the case when a dried or fired article is to be machined, a slit forming member to be used for practicing the present invention is not required to have a hardness such as a bit onto which a high-speed steel edge is brazed or a grind stone to which diamond is electro-deposited. Indeed, it is not required to be a revolving body such as a grinder or a drill.

It is preferable to install a slit forming member in the vicinity of the extruding die, thereby any impact of compression or deformation at the time of extrusion or drying or firing of the molded article can be eliminated as much as possible. Furthermore, the positioning of the slit forming member relative to the targeted cell array may be easily facilitated.

More specifically, if the configuration is such that the slit forming member protrudes in the direction in which, out of the cell blocks of the extruding die, the cell blocks matching the cell arrays in which slits are to be formed are arranged in parallel, the positions of the cell arrays and the slits will match each other to enable fine slits to be accurately formed into the targeted cell array(s) alone.

The slit forming member, as long as it is installed in the vicinity of the extruding die, may be disposed so as to protrude either outwardly or inwardly toward the extruding die or even to protrude both outwardly and inwardly in some cases.

Where the slit forming member protrudes outwardly toward the die, the slit forming member functions as a cutting edge, and slits are formed by cutting the specified array(s) after the formation of the cell.

Figure 1A:
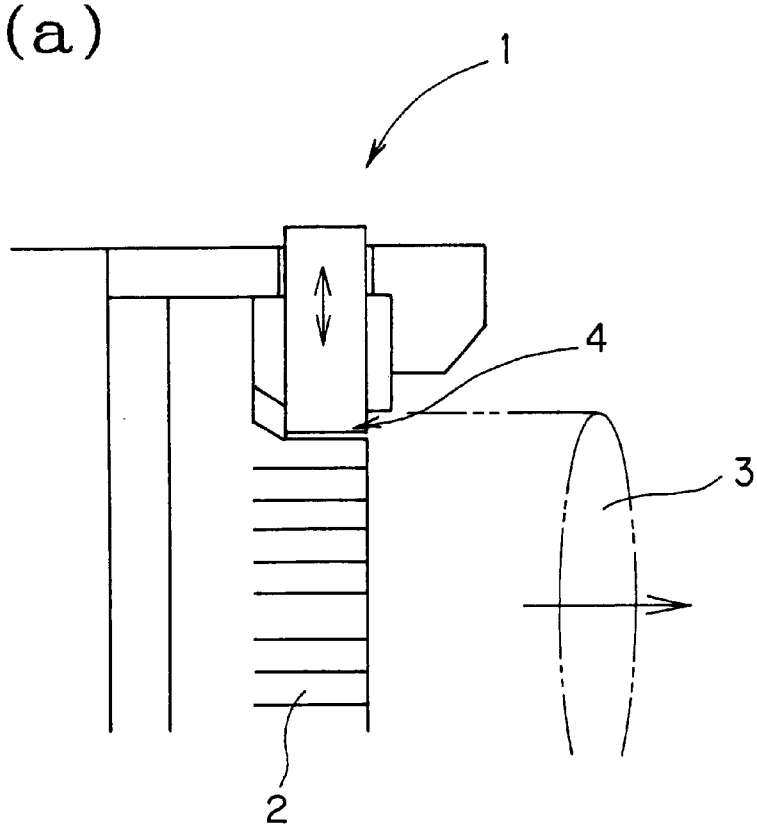

On other hand, in the case where the slit forming member protrudes inwardly toward the die, the slit forming member constitutes a part of the extruding die, and it blocks a puddled mixture to be extruded in that part. As a consequence, slits are formed simultaneously at the time of extruding a honeycomb structure. In this case, as shown in FIG. 1(*a*), if the slit forming member 4 is installed at the position where the tip of the slit forming member 4 is in contact with the cell blocks, slits may be formed only on the external wall of the honeycomb structure, or if the slit forming member 4 is installed following the cell blocks as shown in FIG. 1(*b*), slits 5 can be provided not only on the external wall 3*a* of, but also inside the honeycomb structure.

It is preferable that the thickness of the slit forming member is equal to or less than the diameter of the cell pores not so as to break the cell wall with the slit forming member. In a case where a plurality of adjacent cell arrays are to be cut or ground simultaneously, it is preferable that the thickness thereof is such a thickness that the cell wall on the outermost row of the honeycomb structure is not broken thereby.

Since slits are formed in the molded article during the extrusion step according to the present invention, the slit forming member should be rigid enough not to yield to the extruding pressure of a puddled mixture for forming honeycomb structure. This is because, if it is not rigid enough, the slit forming member may yield to the extruding pressure of the a puddled mixture and be deformed to invite such machining errors as breaking the adjacent cell arrays or cutting the cell wall. A honeycomb structure having a long shape in the extruding direction of a molded article such as a rectangular or a square shape is preferable because it makes the member rigid in that direction.

A manufacturing method according to the present invention allows slits to be formed in any desired length by appropriately adjusting the position of the molded article during extrusion and the timing of protruding the slit forming member. Thus, there is no need for the length of the slit forming member and that of the slit to be identical. Therefore, as long as the aforementioned rigidity is secured, a pin-shaped slit forming member having no length in the extruding direction of the molded article can be used.

Figure 5C:
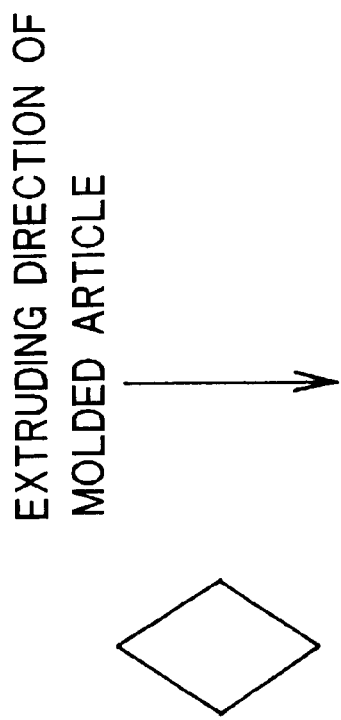
FIGS. 5(a) through 5(c) schematically illustrate edge shapes of a slit forming member usable for the present apparatus.
Figure 5B:
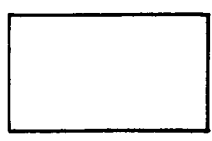
Figure 5A:
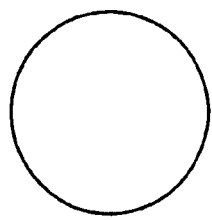

Although the edge shape of the slit forming member is not particularly limited, its sectional shape across the extruding direction of the molded article may be round, rectangular or wedged as illustrated in FIGS. 5(*a*) through 5(*c*). Where the edge shape has corners, such as in a rectangular or wedged shape, it is preferable to have a taper or round shape at the corners to prevent them from developing cracks at the slit end when drying or firing the molded article.

Figures 6A, 6B, 6C, 6D:
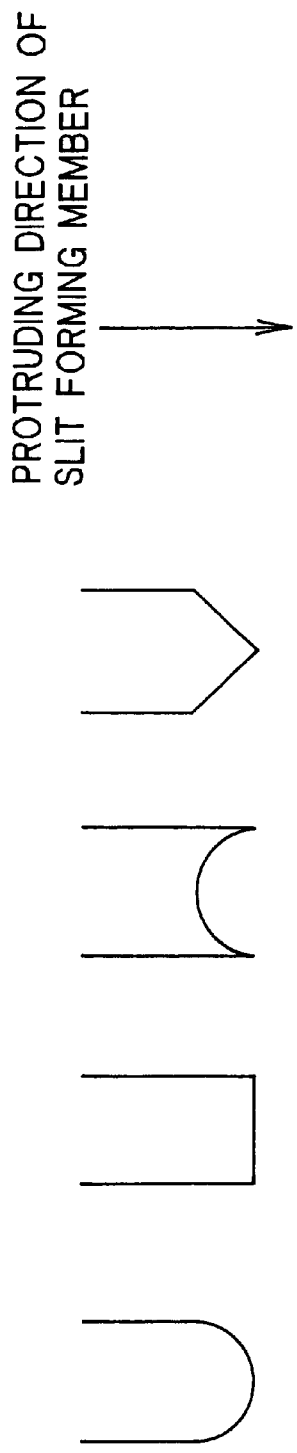
FIGS. 6(a) through 6(g) schematically illustrate edge shapes of another slit forming member usable for the present apparatus.
Figures 6E, 6F, 6G:
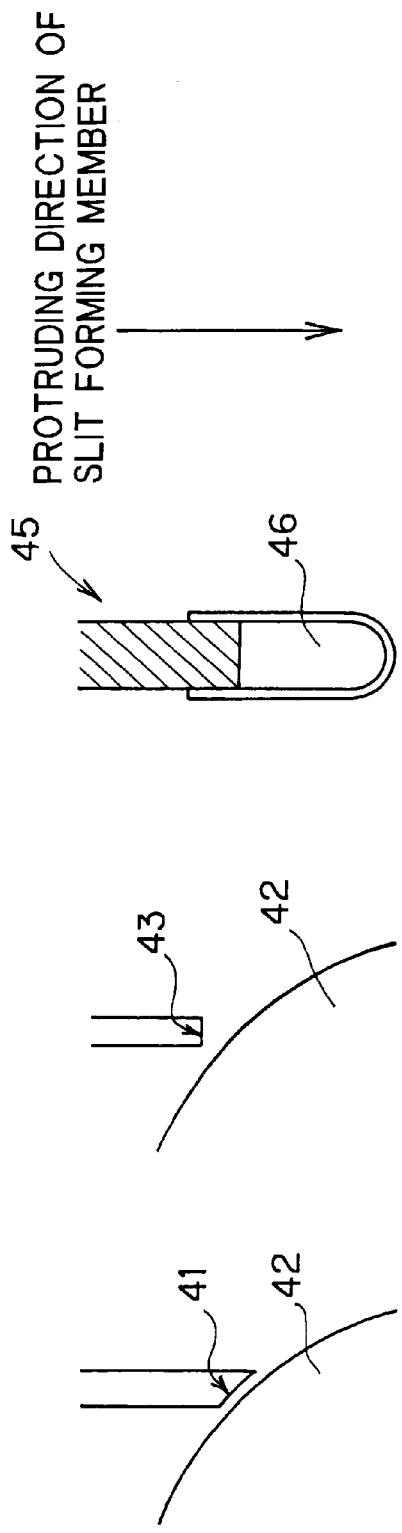

Further, preferable tip sectional shapes across the protruding direction of the slit forming member include, as shown in FIGS. 6(*a*) through 6(*d*), round, rectangular, semi-annular and wedged shapes.

Incidentally, it is preferable to match a tip sectional shape 41 across the protruding direction of the member to the external circumference of the molded article 42 as illustrated in FIG. 6(*e*), because it would enable the edge (tip face) of the slit forming member to cut into the molded article simultaneously, and thereby the shape of the slit ends is formed accurately. Since the slit forming member is protruded toward the molded article being extruded according the present invention, if a tip sectional shape 43 does not match the molded article 42 as shown in FIG. 6(*f*), the part of the edge on the left of the drawing will firstly cut into the molded article. Therefore, the end of the slits would be formed in a steep shape, and not accurately in the intended shape.

Where the slit forming member is to be installed so as to protrude out of the extruding die, it is preferable that the slit forming member is a J-shaped bit.

Where the slit forming member is to protrude out of the die, a slit is cut into the molded article being extruded, resulting in the problem that the generated chip sticks to the slit forming member and thereby increases the machining resistance of the edge. An increase in the machining resistance of the edge is undesirable because it would distort the slit shape or break cell wall on both sides of the slits.

Since a J-shaped bit 45 has a hollow part 46 ahead in the extruding direction of the molded article as illustrated in FIG. 6(*g*), this type of the slit forming member is preferable since the hollow part 46 can scrape and remove chips.

Incidentally, where the slit forming member is to protrude inwardly toward the die, as it constitutes part of the extruding die and forms slits during extrusion step, no such problem arises.

The slit forming member may as well be installed so as to protrude from only one side of the molded article. In this case, however, the greater length and the resultant greater flexibility of the slit forming member might invite distortion of the slit or break the cell walls on both sides of the slits.

An arrangement to protrude the slit forming member toward inwardly toward the molded article from both sides of the molded article would reduce the risk of this problem, and is also preferable in that the slits formed would then be shorter in the internal portion of the structure and longer in the external peripheral portion.

Adjustment of the protrusion, retracting and protruding depth of the slit forming member may be done with a hydraulic cylinder or an electromotive cylinder besides an air cylinder.

Figure 7:
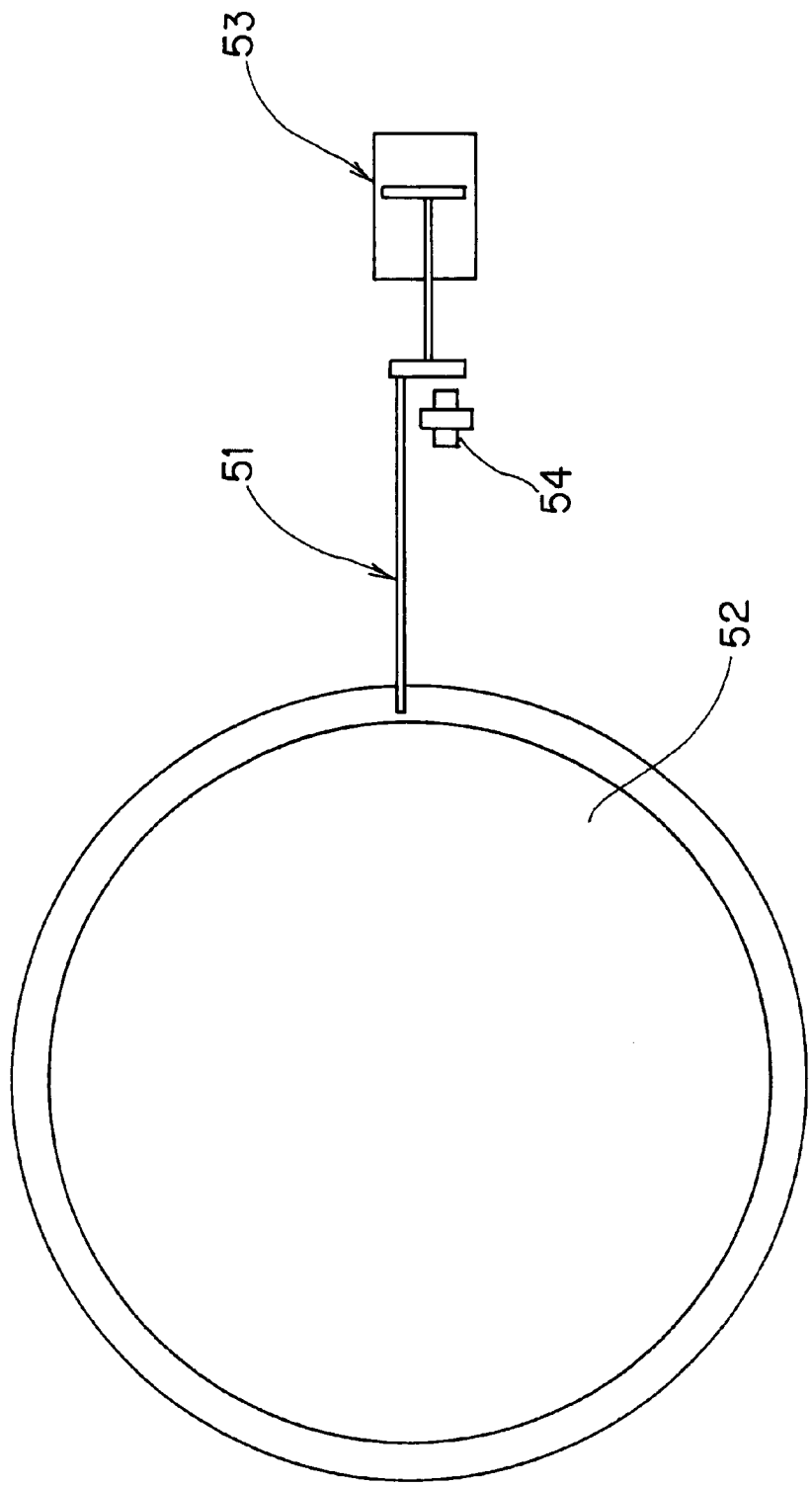
FIG. 7 schematically illustrates one embodiment of the present manufacturing apparatus.

To limit the maximum protruding depth of the slit forming member 51, a stopper 54 may be provided as illustrated in FIG. 7.

It is preferable for the manufacturing apparatus according to the present invention to have monitoring means for monitoring the position of the molded article being extruded and control means for controlling the actions of the slit forming member based on the monitoring data, because slits of any desired length could then be formed in any desired position in the lengthwise direction of the molded article by controlling the actions such as protrusion and retracting of the slit forming member according to the monitored position.

The monitoring means may be a sensor for monitoring the position of the molded article, a sensor for monitoring the extruded volume of a puddled mixture for a honeycomb body or a timer for monitoring the duration period of the extrusion of the puddled mixture.

Figure 8:
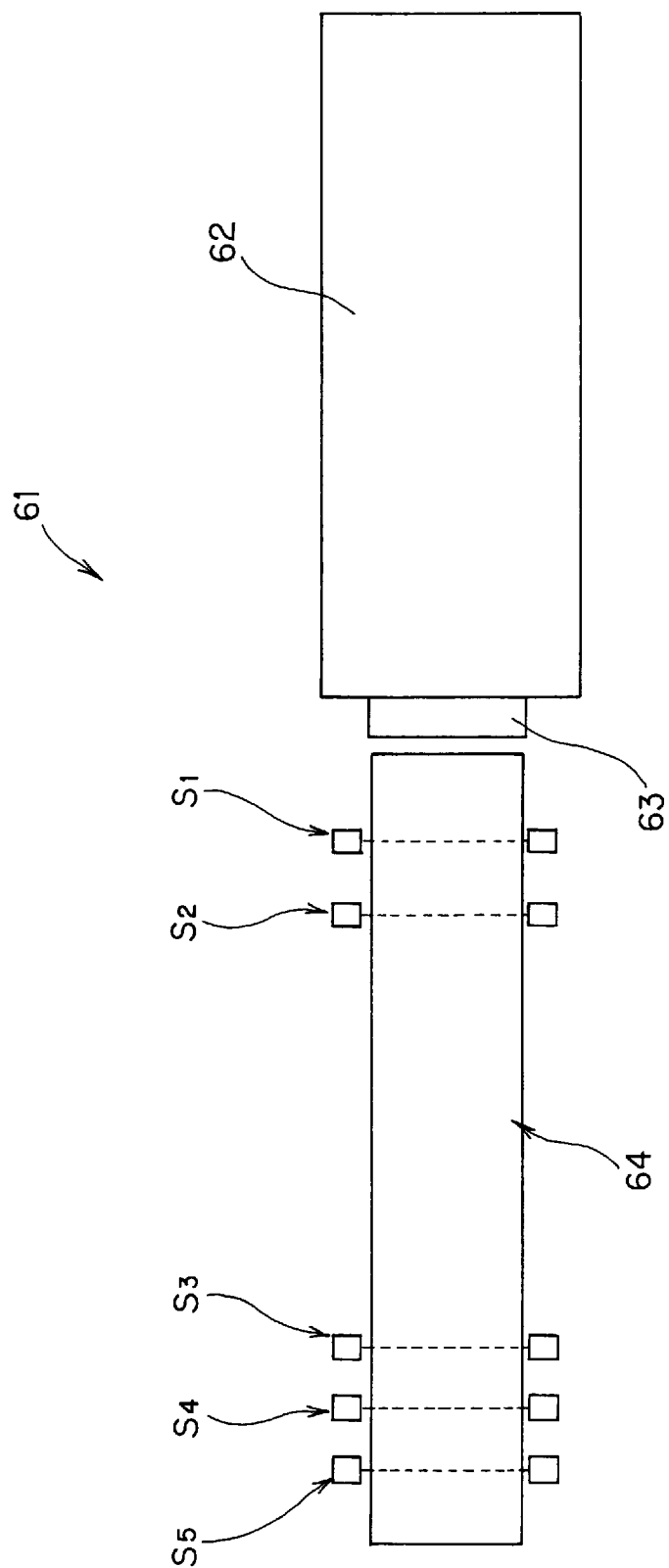
FIG. 8 schematically illustrates one of monitoring means usable for the present apparatus.

For instance, in case of an apparatus for manufacturing a honeycomb body 61 (hereinafter referred to as a manufacturing apparatus) shown in FIG. 8, this apparatus can control the movement of the slit forming member so as to protrude the slit forming member according to signals detected by sensors S1 and S3, and retract the member according to signals detected by sensors S2, based on the result of monitoring the tip position of a molded article with a plurality of sensors S1, S2, S3, and S4 consecutively arranged in the direction of extruding the slit forming member. The manufacturing apparatus 61 can provide a molded article in the vicinity of each of whose ends slits are formed. After the forming of slits, the extrusion of the puddled mixture is stopped in response to a detection signal from the sensor S5, and the terminal part of the molded article is cut off near a die 63.

3. Objects of Application

The manufacturing method according to the present invention is intended to use for the manufacture of a honeycomb structure having slits and having a plurality of arrays of numerous cells aligned in parallel. More specifically, for that of what has a plurality of "arrays of cells" in which the many cells in each array are not formed at random, but arranged in parallel in at least one direction of the honeycomb structure when viewed from the cell opening faces of the structure.

As far as the above-mentioned conditions are met, any type of a honeycomb body may be manufactured by applying the manufacturing method according to the present invention; that is, irrespective of its overall shape, its size, its cell shape, diameter of its cell pore, its spacing of cells (cell wall thickness) or the like, and materials to be used for manufacturing the honeycomb body. For instance, the base can be tubular having a circular, square, rectangular or hexagonal sectional shape, and the material of the base may be selected as appropriate for the particular purpose out of various ceramic materials including alumina, titania, mullite, zirconia, cordierite, and any mixture of them.

The shape of individual cells, too, can be circular, rectangular, pentagonal or hexagonal, and in some cases even a plurality of cell shapes can be formed in combination by using cell blocks such as the one illustrated in FIG. 4.

However, it is preferable that the shape of the cells of the cell arrays in which the slits are to be formed is a rectangular shape. This is because the slit forming member can move forwards easily along the internal wall of cells, thereby machining errors such as breaking adjacent cell arrays or cutting cell walls are prevented, in a case of a honeycomb body having rectangular cells whose internal walls are linearly configured relative to the protruding direction of the slit forming member.

4. Usage of Honeycomb Structure

A honeycomb structure having slits, as described above, can be used particularly suitably as a solid-liquid separation filter. For instance, a solid-liquid separation filter can be produced by drying a green honeycomb molded article produced by the manufacturing method according to the present invention, firing the resultant after sealing the cell opening faces of the slit-formed cell arrays thereof, and, in case of need, forming further ceramic filtering diaphragm on the internal walls of cells other than the cells in which the slits have been formed by dipping or the like.

Figure 12A:
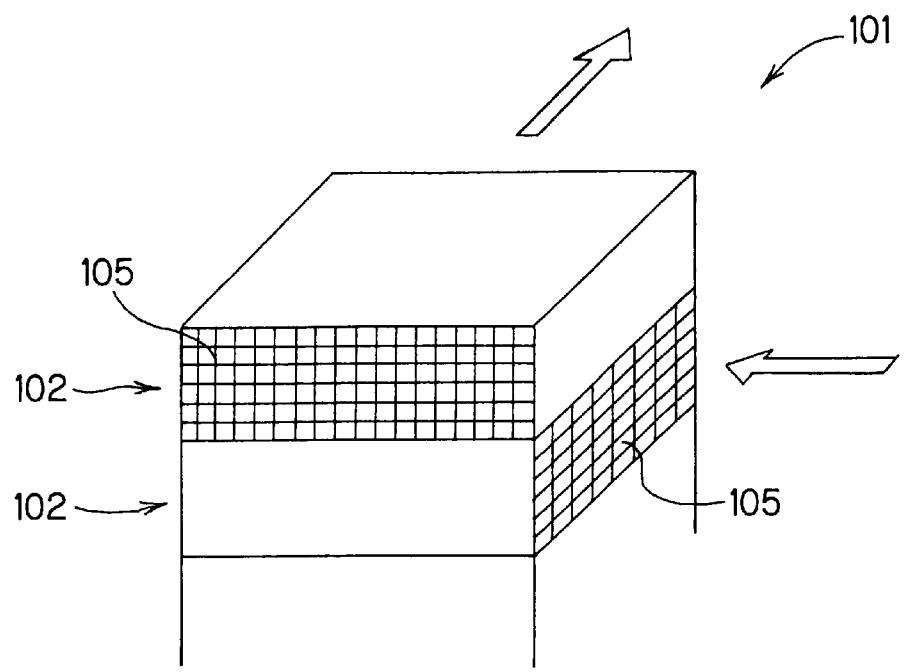
Figure 12B:
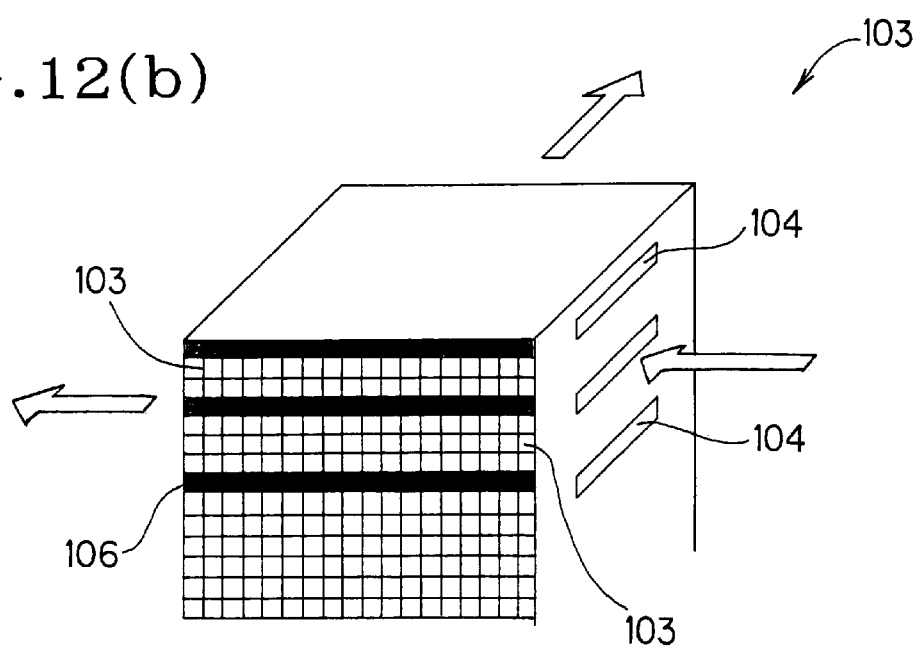

A honeycomb structure having slits according to the present invention may be usable as a heat exchanger. When the conventional type of honeycomb structure is used for preparing a heat exchanger, a plurality of honeycomb structures are crossing and stacking each other as a block 102 to form a heat exchanger 101 by using the cells 105 thereof directly as a heat path, as is illustrated in FIG. 12(a). However, in case of a honeycomb structure having slits shown in FIG. 12(b) manufactured according to the present invention, a heat exchanger 103 may be constituted of only a single body structure by using cell arrays having slits 104 and being sealed with a sealing member 106 at their ends, and other arrays of cells 105 as crossing heat paths, respectively.

Thus, the manufacturing method according to the present invention is advantageous in that such a heat exchanger can be integrally manufactured thereby.

Embodiments

The manufacturing method according to the present invention will be described in further detail with reference to embodiments thereof. It has to be noted, however, the present invention is not limited to the following embodiments.

For both the Embodiments and the Comparative example, a puddled mixture formed by admixing alumina powder of 150 mm in average grain size, an organic binder and water was used as the molding material.

For extrusion, a plunger extruder was used, and as the extruding die was used a hollow round one of 180 mm in inside diameter, in whose hollow part were arranged hexagonal cell blocks of 3 mm in the across flat length at a 3.6 mm pitch. This extruding die can give a honeycomb molded article in which about 2000 cells are formed. The extrusion length of the molded article was set to 1000 mm.

In both the Embodiments and the Comparative example, nine slits were formed in every sixth cell array at the portion of 30 to 100 mm from the two ends of the respective honeycomb structures; all of which went through the respective honeycomb structure. Thus a total of 18 slits (9×2 ends) were formed per honeycomb structure.

1) Machining Errors

The number of machining errors, including breakage of adjacent cell arrays and accidental cutting of cell walls, which occurred during the forming of 18 slits in a honeycomb structure were counted. Each case of complete absence of machining error was marked with ⊙, and one in which any error was found was marked with ×.

2) Accuracy of Groove Width

For Embodiments 1 through 3, the groove widths of the slits were measured after drying the respective molded article in which slits had been formed. For Comparative Example 1, slits were formed into the dried article, and the groove widths of the slits were immediately measured thereafter. Groove widths of not less than 1.5 mm and within 2.5 mm were marked with ⊚, ones over 2.5 mm or not more than 3.0 mm, with Δ, and others, with x.

3) Hours Required for Machining

Hours required to form 18 slits in each honeycomb structure were measured. Cases taking no extra machining time after the completion of the extrusion forming were marked with ⊚, while others that did take an extra machining time after the completion of the extrusion forming was marked with x.

Embodiment 1

Figure 1B:
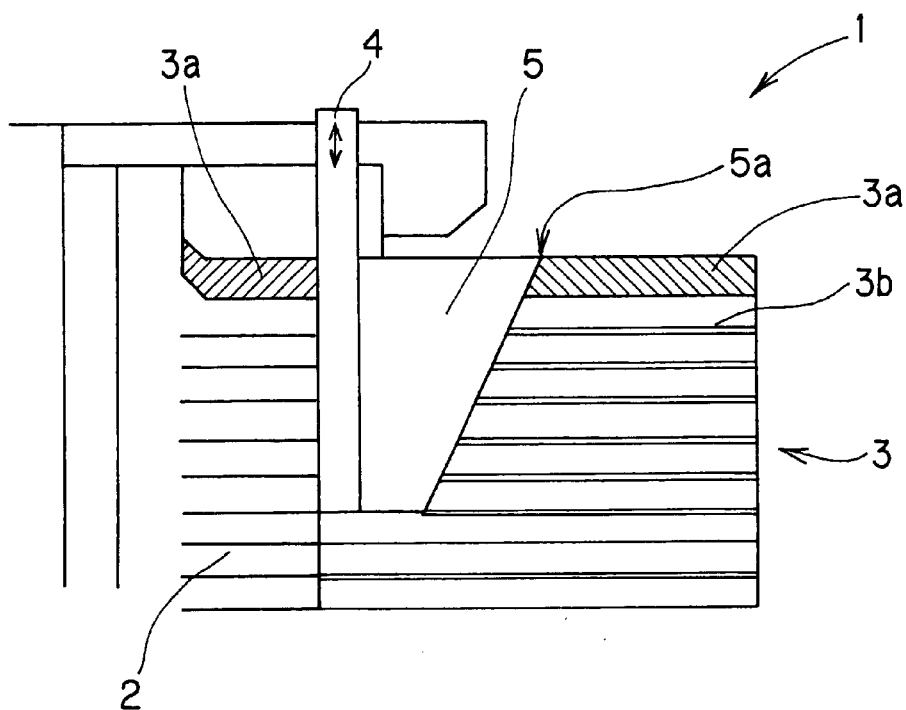

Slits were formed in a honeycomb structure at to extrusion step, using a manufacturing apparatus 1 shown in FIG. 1(b), which was equipped with a plate 4 having a width of 2.4 mm and a length of 6.7 mm as a slit forming member. The slit forming member was installed so as to protrude within an extruding die 2, and from both sides of a molded article 3 inwardly toward a molded article 3. The results are shown in Tables 1 and 2.

ing the specified portions of the respective cell arrays in which slits were to be formed at both end faces where cell openings were located of the structure 93, and slits 95 were formed by cutting the marked portions with a grinding stone 94 on which diamond was electro-deposited. The results are shown in Tables 1 and 2.

TABLE 1

|  | Machining method | Timing of slit formation | Slit forming member |
|---|---|---|---|
| Embodiment 1 | Protrusion | During extrusion | Planar |
| Embodiment 2 | Protrusion | During extrusion | Pin |
| Embodiment 3 | Cutting | During extrusion | J-shaped bit |
| Comparative Example 1 | Cutting | After drying/firing | Grinding stone |

TABLE 2

|  | Machining errors (numbers formed) | | Accuracy of groove width (mm) | | Machining time (min) | | Tool durability | | Workability | | Cost | | Overall evaluation |
|---|---|---|---|---|---|---|---|---|---|---|---|---|---|
| Embodiment 1 | 0 | ⊚ | 1.5–2.0 | ⊚ | 0 | ⊚ | Long | ⊚ | Automatic, no marking | ⊚ | Low | ⊚ | ⊚ |
| Embodiment 2 | 0 | ⊚ | 1.5–2.0 | ⊚ | 0 | ⊚ | Long | ⊚ | Automatic, no marking | ⊚ | Low | ⊚ | ⊚ |
| Embodiment 3 | 0 | ⊚ | 2.0–2.4 | ⊚ | 0 | ⊚ | Long | ⊚ | Automatic, no marking | ⊚ | Low | ⊚ | ⊚ |
| Comparative Example 1 | 7 | x | 2.6–3.0 | Δ | 32 | x | Short | x | Manual, marking required | x | High | ⊚ | x |

Incidentally, for the manufacturing apparatus of FIG. 1(b), the slit forming member installed on only one side of the molded article is illustrated for the convenience of the drawing, and the one on the other side is omitted. The same is true of the manufacturing apparatuses shown in FIGS. 9 through 11, as well.

Embodiment 2

Figure 9:
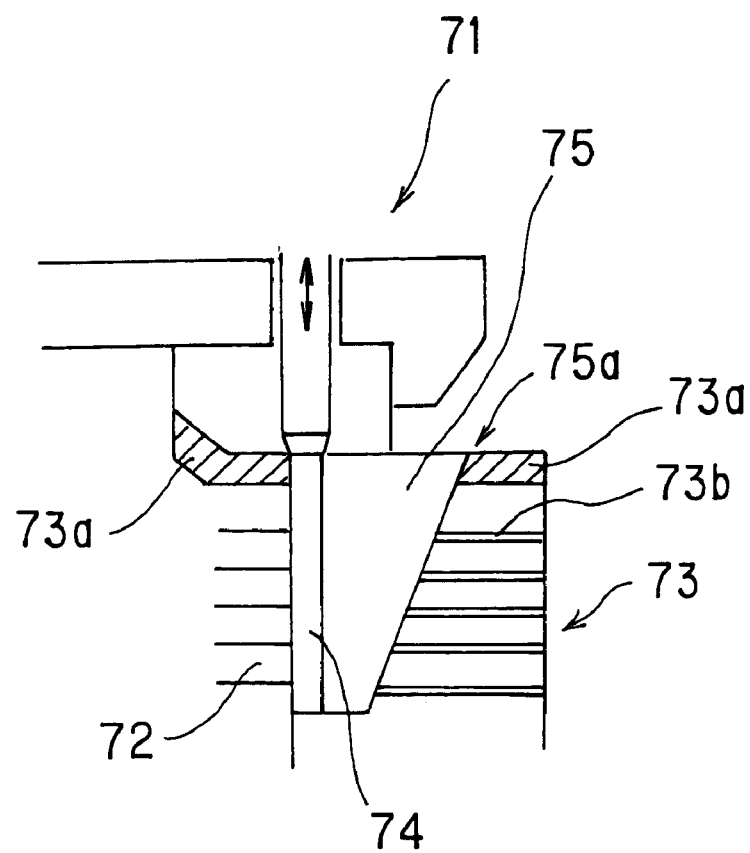
FIG. 9 is a schematic sectional view of forming slit portion according to one preferred embodiment of the present method for manufacturing a honeycomb structure having slits.

Slits were formed at the extrusion step by using a manufacturing apparatus 71 shown in FIG. 9, equipped with a pin 74 having a diameter of 2.4 mm as a slit forming member. The slit forming members was installed so as to protrude within an extruding die 72, and from both sides of a molded article 73 inwardly toward a molded article 73. The results are shown in Tables 1 and 2.

Embodiment 3

Figure 10:
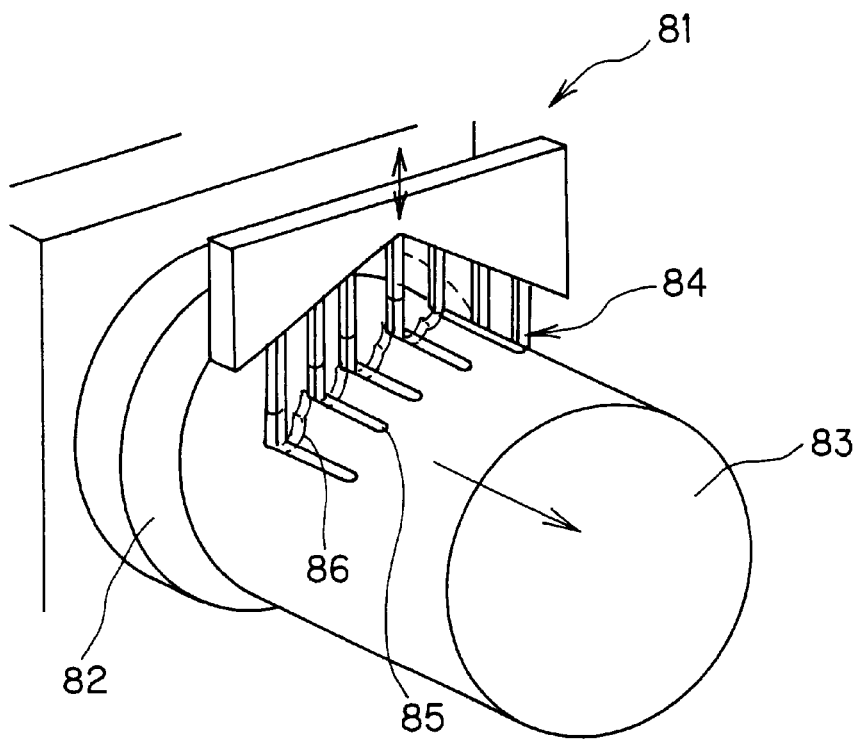
FIG. 10 illustrates a schematic partial view according to another preferred embodiment of the present method for manufacturing a honeycomb structure having slits.
Figure 11:
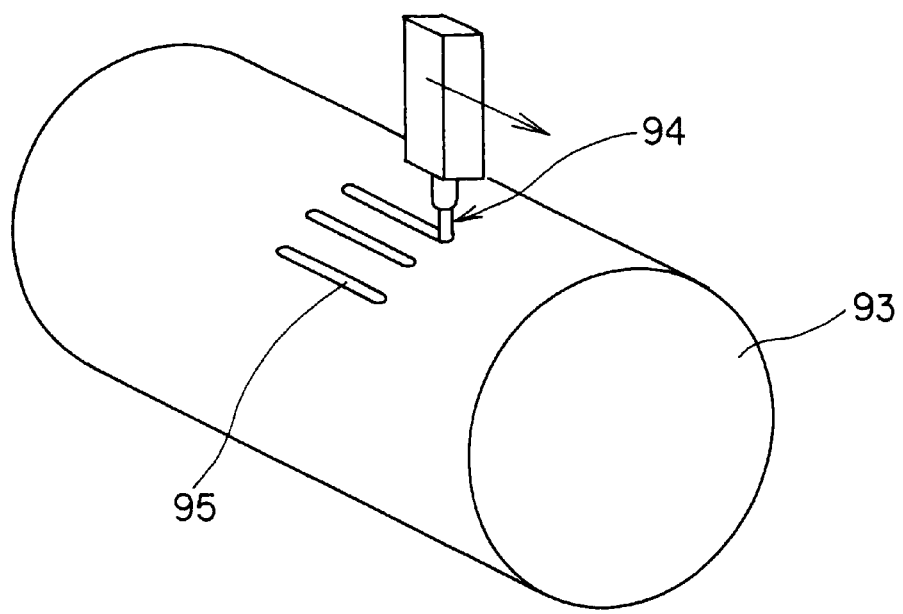
FIG. 11 is a schematic diagram illustrating a honeycomb structure having slits manufactured according to the conventional method.

Slits 85 were formed at the extrusion step by using a manufacturing apparatus 81 in FIG. 10, equipped with a J-shaped bit 84 having a width of 2.4 mm as a slit forming member. The slit forming member was installed so as to protrude outwardly toward an extruding die 82, but from both sides of a molded article 83 toward inwardly toward a molded article 83. The results are shown in Tables 1 and 2.

Comparative Example 1

After drying a molded ankle having no slits formed, the external side face of a honeycomb structure obtained as dried molded article 93 was marked with a line by connect- Results 1) Machining Errors While no machining error occurred with any of Embodiments 1 through 3, cell walls were accidentally cut in seven positions in Comparative Example 1.

2) Accuracy of Groove Width

Regarding Embodiments 1 through 3, although a slight contraction of slit width was observed after drying Embodiments 1 and 2, there was no problem in practical use, and the accuracy of groove width was satisfactory in both cases. In Comparative Example 1, the accidental cutting of cell walls in some cases almost broke the cell walls, and the accuracy of groove width was poor.

3) Machining Time

While no extra machining time was taken to form slits in Embodiments 1 through 3 because slits were formed simultaneously with extrusion, 32 extra minutes were taken for Comparative Example 1 as 18 slits; nine each in two positions had to be formed while the worker was watching the article.

Other Findings

For Comparative Example 1, as slits were formed in a hardened dried article, the grinding stone was worn out soon. On the other hand, for Embodiments 1 through 3, where a green body of a molded article was machined in every case, the slit forming member wore long. The planar slit forming member of Embodiment 1 lasted longest, followed by the pin of Embodiment 2 and the J-shaped bit of Embodiment 3 in that order.

Furthermore, while Embodiments 1 through 3 required no particular manual machining task as an automated manufacturing apparatus formed slits, the work on Comparative Example 1 was troublesome, involving marking on the external face of the structure and cutting while directly watching the structure with naked eyes. Moreover, in case of Comparative Example 1, it required a longer machining time per honeycomb structure, and the tool was quickly out of order. Furthermore, it required a high machining cost attributable to the troublesome work.

To totally evaluate the above-described individual aspects, while Embodiments 1 through 3 gave satisfactory overall results, Comparative Example 1 involved problems in all respects including machining accuracy, machining time, tool durability, workability and cost.

As hitherto described, the manufacturing method and the manufacturing apparatus according to the present invention permit accurate forming of fine slits to cut or grind the targeted cell array(s) alone and moreover are suitably applicable to mass production.

What is claimed is:

1. A method for manufacturing an extruded honeycomb structure, comprising the steps of:

extruding a honeycomb structure having a plurality of arrays of cells aligned in parallel; and moving a slit forming member toward and any from said honeycomb structure to engage and disengage a portion of an outer surface of said honeycomb structure during said extruding step to form slits along said arrays while said honeycomb structure is extruded;

wherein said slits communicate with an external space and with an interior of at least one cell of said honeycomb structure.

2. The method according to claim 1 wherein said slits are formed simultaneously with said cells by extrusion.

3. A method for manufacturing an extruded honeycomb structure having slits and a plurality of arrays of numerous cells aligned in parallel, said slits communicating with an external space and with an interior of at least one cell of said extruded honeycomb structure, said slits being formed along said arrays;

wherein said slits are formed while said honeycomb structure is extruded by protruding a slit forming member toward said honeycomb structure; and wherein the position of said honeycomb structure being extruded is monitored during extrusion, and the actions of said slit forming member are controlled based on monitoring data.

4. The method according to claim 3, wherein the position of said honeycomb structure being extruded is monitored during extrusion, and the actions of said slit forming member are controlled based on monitoring data.

5. A method for manufacturing an extruded honeycomb structure having slits and a plurality of arrays of numerous cells aligned in parallel, said slits communicating with an external space and with an interior of at least one cell of said extruded honeycomb structure, said slits being formed along said arrays;

wherein said slits are formed during the extrusion process of said honeycomb structure, after fanning said arrays of cells, by protruding a slit forming member toward said honeycomb structure; and wherein the position of said honeycomb structure being extruded is monitored during extrusion, and the actions of said slit forming member are controlled based on monitoring data.

* * * * *

UNITED STATES PATENT AND TRADEMARK OFFICE
CERTIFICATE OF CORRECTION

PATENT NO. : 6,723,262 B2  
DATED : April 20, 2004  
INVENTOR(S) : Kazuhiko Hidaka and Tetsuji Takagi It is certified that error appears in the above-identified patent and that said Letters Patent is hereby corrected as shown below:

<u>Column 13,</u>  
Line 5, change "any" to -- away --

<u>Column 14,</u>  
Line 8, change "fanning" to -- forming --

Signed and Sealed this

First Day of June, 2004

JON W. DUDAS  
*Acting Director of the United States Patent and Trademark Office*

UNITED STATES PATENT AND TRADEMARK OFFICE
CERTIFICATE OF CORRECTION

PATENT NO. : 6,723,262 B2
DATED : April 20, 2004
INVENTOR(S) : Kazuhiko Hidaka and Tetsuji Takagi It is certified that error appears in the above-identified patent and that said Letters Patent is hereby corrected as shown below:

Column 13,
Line 30, change "any" to -- away --.

Column 14,
Line 28, change "fanning" to -- forming --.

This certificate supersedes Certificate of Correction issued June 1, 2004.

Signed and Sealed this

Twenty-fifth Day of October, 2005

JON W. DUDAS
*Director of the United States Patent and Trademark Office*